Jan. 28, 1947.　　　R. F. LINDSAY ET AL　　　2,414,822
WIRE REINFORCED BELT
Filed June 25, 1943
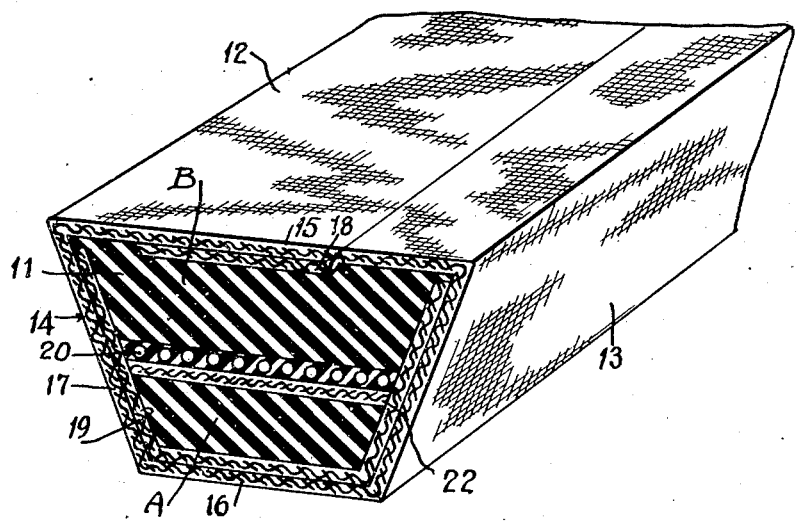
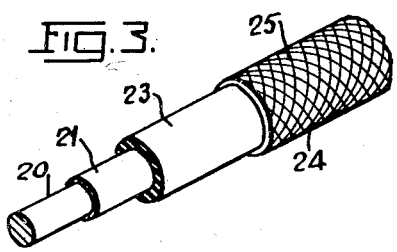
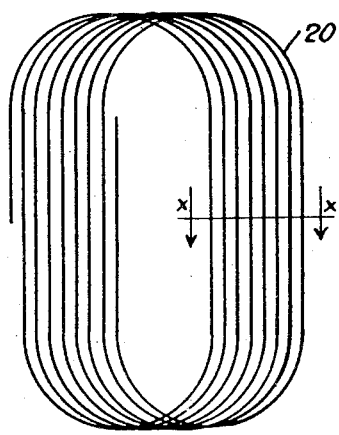
INVENTORS
RALPH F. LINDSAY,
BY ALLEN R. LINDSAY
ATTORNEYS Patented Jan. 28, 1947

2,414,822

UNITED STATES PATENT OFFICE 2,414,822

WIRE REINFORCED BELT

Ralph F. Lindsay, Detroit, Mich., and Allen R. Lindsay, Cleveland, Ohio, assignors to The Dayton Rubber Manufacturing Company, Dayton, Ohio, a corporation of Ohio Application June 25, 1943, Serial No. 492,224

6 Claims. (Cl. 74—233)

This application relates to V-belts, and more particularly deals with a V-belt in which the neutral axis section comprises one or more layers of wires which are laid parallel to each other and along the longitudinal axis of the belt.

Such belts may be of the raw edge type or of the wrapped type and may be either plain or cogged depending on the purpose for which they are to be used. Furthermore, such belts are adapted for use either in single belt drives or in multiple belt drives.

Hitherto cords made of textile material such as cotton have been employed as strength members in the neutral axis section of V-belts. According to the present invention, metal wire is substituted for textile cord and a belt is thereby produced which possesses characteristics of longitudinal inextensibility, strength, and service life, far greater than obtainable with belts of the same general type but in which textile cords are employed.

Belts of the type under consideration are generally run over pulleys of small diameter and they are, therefore, subjected in service to repeated flexing. The body of the belt is of considerable depth or thickness, and the tension stresses in the body portion above or outside of its neutral axis, and the compressive stresses in the body portion below or inside this axis, are very considerable. The neutral axis may be defined as that part of the belt wherein neither compression nor tension is imposed as the belt turns over a pulley or sheave of small diameter, and thus it may be said that the neutral axis section is the load bearing part of the belt.

The purpose of the present invention is to provide a belt having characteristics of longitudinal inextensibility, long service life, and structural strength superior to those characteristics as obtained in similar types of belts in which the neutral axis section comprises textile cords. Metal wires of the desired tensile strength may be selected for this purpose, but the problem of adhering the metal and the rubber composition of which the body of the belt is made so as to form a firm and permanent bond presents material obstacles and hitherto such a desirable firm and lasting bond has been unobtainable. According to the present invention, however, means are provided whereby proper adhesion between the rubber composition of which the body of the belt is made and the metal wires in the neutral axis section may be obtained thus producing a unitary body having the desired characteristics.

The present invention comprises, in essence, the employment for reinforcing of a member of metal such as wire several times the length of the belt and arranging this reinforcing in helically related parallel convolutions within the belt body, these convolutions being disposed in a single layer so as to define a cylinder when the belt is in the form of a circle, this cylinder being at the neutral zone of the belt. Therefore, any transverse belt section will include a plurality of sections of the reinforcing member all disposed along the line of the neutral axis of the belt.

The nature of the invention and the objects and advantages thereof will be apparent and better understood from the following description taken in connection with the accompanying drawing, wherein:

Fig. 1 is a transverse section of a V-belt constructed according to the present invention;

Fig. 2 illustrates the reinforcing member, the convolutions of which appear in Fig. 1, the section of Fig. 1 corresponding to the section indicated at X—X in Fig. 2; and Fig. 3 illustrates a preferred form of the reinforcing wire which may be used in the manufacture of the belt of this invention.

Referring now to the drawing, the main bulk portion 11 of the belt is provided by its body material which may be preferably a rubber composition. The belt has an outer face 12 and an inner face there-opposite denominated 16, and flat converging sides 13 so that the section is in the form of a keystone with converging side walls 14 and generally parallel top and bottom walls 15 and 16, respectively. To maintain this shape the body material has wrapped thereabout and vulcanized therewith a wrapper 17 preferably of rubberized fabric which may be advantageously cut on a bias, and which may be overlapped as indicated at 18 along the outer face 12 of the belt.

A second or reinforcing wrapper 19 may extend from the bottom up along the sides of the belt as indicated. It will be obvious to those skilled in the art, however, that any other form of wrapper may be employed and that the belt of this invention need not necessarily be a wrapped belt but that it may also be a belt of the so-called raw edge type.

The reinforcing member which ultimately comprises the strength member in the neutral axis section comprises an elongated metallic member arranged in coil form as shown in Fig. 2. This member is preferably a single strand of alloy steel wire and we have successfully employed for the purpose a sheave wire of 40–60 carbon steel containing probably also some nickel. Since it is essential that a good bond be had between the wire and the body material of the belt throughout the length of the former, we may advantageously pretreat the wire such as by copper plating or by the employment of the well known Avery process.

The wire reinforcing member is advantageously buried or embedded in the body material of the belt with its convolutions disposed to run with the belt generally along the neutral zone thereof. More specifically, by such terminology we mean that in the belt section the wires may be disposed exactly upon the line of the neutral axis, or may be slightly thereabove or, so to speak, tangent to this line. At any rate, the convolutions of the wire are somewhat spaced one from another so that at least some body material is therebetween, and the convolutions are parallel so that in the transverse section of the belt there will be a plurality of sections 20 of the reinforcing member disposed along or adjacent the line of the neutral axis of the belt, each section of the reinforcing member showing the treated surface 21. Preferably a breaker strip 22 of open weave friction material is arranged to underlie the reinforcing member to serve as a support for fixation of the convolutions thereof in addition to performing its usual functions of resisting lateral compression of the belt.

In making the belt the covers 17 and 19 are laid in the groove of a circular forming mould. A strip of unvulcanized rubber, as indicated at A, Fig. 1, having a depth from the bottom of the belt up to the desired location for the breaker strip is laid in the mould. The breaker strip is laid over this strip and a thin layer of unvulcanized bonding rubber is laid over the breaker strip. The reinforcing member is then wound in the form with sufficient tension to embed it in the bonding rubber and to press it against the breaker strip, the convolutions of the reinforcing member being properly spaced from each other during the winding operation. Obviously at the end of the winding operation the reinforcing member will have true helical form with its convolutions parallel and defining a cylinder.

Next a bulk strip B (see Fig. 1) of unvulcanized rubber is laid over the turns of the reinforcing member, this strip being of proper depth according to the desired depth of the belt above the reinforcing member. The ends of the wrapper 17 are then turned down to overlie the top of the strip B.

The built-up belt body is then vulcanized whereupon the strips A and B, the bonding strip in which the reinforcing member is embedded, and the breaker strip 22 are made integral with the result that a unitary article is formed. Due to the treatment to which the reinforcing member is subjected prior to its use, the reinforcing member is likewise bonded with the rubber throughout its length.

Referring now to Fig. 3 of the drawing, 20 is a steel wire having thereon a plate 21 such as of copper which is adapted to increase the bonding action between the rubber composition of which the belt is made and the metal wire itself. It is believed that some of the components of the rubber composition react chemically with the copper plate on the wire and thereby bring about a firmer bond between the rubber and the metal; however, there is no experimental proof of this fact, and it is set forth herein simply as theory and is not to be construed as a limitation.

The reinforcing member 20 may be employed without any further treatment, but we have found it advantageous in certain instances further to process the reinforcing member in order to obtain a stronger bond. For example, as shown in Fig. 3, a coating 23 of unvulcanized rubber may be applied over the plate 21 on the wire 20 and thereover may be placed a braided sleeve 24 of open weave made either of textile fiber or of fine metal wire. The product thus obtained is generally referred to by the numeral 25 and may be employed in place of the reinforcing member 20 with plate 21 thereon. Since the rubber coating 23 is of unvulcanized rubber and the sleeve 24 is of open weave, the rubber coating 23, under the influence of heat and pressure (in vulcanizing the belt body) will flow through the openings on the sleeve 24 and thus provide a firm bond between the rubber composition forming the body of the belt and the plate 21 on the wire 20.

It will be understood that while we have herein described and illustrated in the annexed drawing certain embodiments of our invention, it is not our intention to have this invention limited to or circumscribed by the specific details of construction, arrangement of parts, procedures and proportions described or illustrated in view of the fact that our invention is susceptible to modifications according to individual conditions and preference without necessarily departing from the spirit of this disclosure and the scope of the appended claims.

We claim:

1. In an endless belt of the class described, reinforcing means comprising a metallic member of length greater than that of the belt, and arranged in helical form with its convolutions spaced from each other and disposed to run with the belt along the neutral zone thereof, said metallic member consisting of a steel wire core plated with copper and having a further coating of rubber composition and an outer sleeve of a loose weave material therearound.

2. In an endless belt of the class described, reinforcing means comprising a metallic member of helical form, having a plurality of convolutions spaced from each other and disposed to run with the belt along the neutral zone thereof, said metallic member consisting of a steel wire core plated with copper and having a further coating of rubber composition and an outer sleeve of a loose weave fabric therearound.

3. An endless belt of the class described, comprising a helical metallic member having a plurality of convolutions spaced from each other and running with the belt, and a body substance having substantial portions thereabove and therebelow, and extending therebetween and joined therewith throughout the length of said member, said metallic member consisting of a steel wire core plated with copper and having a further coating of rubber composition and an outer sleeve of a loose weave material therearound.

4. An endless belt of the class described, comprising a body of flexible material, and reinforcing means therefor comprising a helical metallic member having a plurality of spaced convolutions therewithin and disposed to run with the belt along the neutral zone thereof, whereby any transverse belt section will include a plurality of sections of the reinforcing member disposed along the line of the neutral axis of the belt, said metallic member consisting of a steel wire core plated with copper and having a further coating of rubber composition and an outer sleeve of a loose weave metal fabric therearound.

5. In an endless belt of the class described, reinforcing means comprising a metallic member of helical form having a plurality of convolutions spaced from each other and disposed to run with the belt and a breaker strip underlying said convolutions, said metallic member consisting of a steel wire core plated with copper and having a further coating of rubber composition and an outer sleeve of a loose weave material therearound.

6. An endless belt of the class described comprising a helical metallic member having a plurality of spaced convolutions running with the belt, and a rubber body having substantial portions thereabove and therebelow, and extending therebetween, said member consisting of a steel wire core plated with copper and having a further coating of a rubber composition and an outer sleeve of a loose weave material therearound and being bonded with said portions of said rubber body throughout its length.

RALPH F. LINDSAY.
ALLEN R. LINDSAY.